United States Patent
Nie et al.

(10) Patent No.: US 12,190,520 B2
(45) Date of Patent: Jan. 7, 2025

(54) PYRAMID ARCHITECTURE FOR MULTI-SCALE PROCESSING IN POINT CLOUD SEGMENTATION

(71) Applicant: Alibaba (China) Co., Ltd., Hangzhou (CN)

(72) Inventors: Dong Nie, Bellevue, WA (US); Xiaofeng Ren, Yarrow Point, WA (US)

(73) Assignee: Alibaba (China) Co., Ltd., Hangzhou (CN)

(*) Notice: Subject to any disclaimer, the term of this patent is extended or adjusted under 35 U.S.C. 154(b) by 358 days.

(21) Appl. No.: 17/857,529

(22) Filed: Jul. 5, 2022

(65) Prior Publication Data
US 2024/0013399 A1    Jan. 11, 2024

(51) Int. Cl.
*G06T 7/11* (2017.01)
*G06T 3/40* (2024.01)

(52) U.S. Cl.
CPC ............... *G06T 7/11* (2017.01); *G06T 3/40* (2013.01); *G06T 2207/10028* (2013.01); *G06T 2207/20016* (2013.01)

(58) Field of Classification Search
CPC ... G06T 7/11; G06T 3/40; G06T 2207/10028; G06T 2207/20016; G06T 9/001; G06T 2207/20084; G06T 9/40; G06T 2207/20081; G06T 7/10; G06T 9/002; G06T 3/4046; G06T 9/005; G06T 15/08; G06T 2207/20076; G06V 20/70; G06V 10/82; G06V 10/454; G06V 20/64; G06V 10/764

See application file for complete search history.

(56) References Cited

U.S. PATENT DOCUMENTS

| | | | |
|---|---|---|---|
| 8,494,285 B2* | 7/2013 | Zhang | ............ G06T 7/162 382/284 |
| 8,503,730 B2 | 8/2013 | Kotaba | |
| 8,521,418 B2 | 8/2013 | Ma et al. | |
| 8,699,787 B2 | 4/2014 | Van Den et al. | |
| 8,860,712 B2 | 10/2014 | Lowe et al. | |
| 8,948,498 B1 | 2/2015 | Hickman et al. | |
| 9,082,224 B2 | 7/2015 | Birtwistle et al. | |
| 9,153,061 B2 | 10/2015 | Vaddadi et al. | |

(Continued)

OTHER PUBLICATIONS

Arief et al., Density-adaptive Sampling for Heterogeneous Point Cloud Object Segmentation in Autonomous Vehicle Applications, CVPR Workshop paper, 2019.

(Continued)

*Primary Examiner* — Michael S Osinski

(57) ABSTRACT

This application describes cross-scale point cloud segmentation network architecture for and exemplary systems that utilize such network architecture for semantic segmentation of a point cloud. An embodiment of the network architecture includes an encoding path comprising a plurality of sequentially connected encoding nodes, a decoding path following the encoding path and comprising a plurality of sequentially connected decoding nodes, and a plurality of data links respectively corresponding to a plurality of levels of feature resolution, in which each of the plurality of data links connects one of the plurality of encoding nodes and one of the plurality of decoding nodes that have a same level of feature resolution.

20 Claims, 7 Drawing Sheets

(56) References Cited

U.S. PATENT DOCUMENTS

| | | | |
|---|---|---|---|
| 9,412,040 B2 | 8/2016 | Feng et al. | |
| 9,786,062 B2 | 10/2017 | Sorkine-hornung et al. | |
| 9,865,042 B2* | 1/2018 | Dai | G06T 7/11 |
| 10,178,366 B2 | 1/2019 | Lucas | |
| 10,319,146 B2 | 6/2019 | Steinbach et al. | |
| 10,321,116 B2 | 6/2019 | Metzler et al. | |
| 10,504,282 B2 | 12/2019 | Levinson et al. | |
| 10,679,351 B2* | 6/2020 | El-Khamy | G06F 18/24143 |
| 10,699,477 B2 | 6/2020 | Levinson et al. | |
| 11,073,619 B2 | 7/2021 | Ho | |
| 2014/0037198 A1* | 2/2014 | Larlus-Larrondo | G06T 7/11 382/173 |
| 2014/0328535 A1 | 11/2014 | Sorkine-hornung | |
| 2015/0178988 A1 | 6/2015 | Montserrat Mora et al. | |
| 2018/0276875 A1 | 9/2018 | Pylvaenaeinen et al. | |
| 2019/0108639 A1 | 4/2019 | Tchapmi et al. | |
| 2019/0114774 A1* | 4/2019 | Zhang | G06N 3/04 |
| 2019/0139267 A1* | 5/2019 | Mokrushin | H04N 19/33 |
| 2020/0099954 A1* | 3/2020 | Hemmer | H04N 19/186 |
| 2020/0107033 A1* | 4/2020 | Joshi | H04N 19/44 |
| 2020/0134375 A1* | 4/2020 | Zhan | G06V 10/82 |
| 2020/0364570 A1* | 11/2020 | Kitamura | G06F 18/217 |
| 2020/0364870 A1* | 11/2020 | Lee | G06N 3/048 |
| 2020/0372676 A1 | 11/2020 | Tzur | |
| 2021/0056730 A1* | 2/2021 | Ricard | G06T 9/00 |
| 2021/0118163 A1* | 4/2021 | Guizilini | G06T 7/50 |
| 2021/0192797 A1* | 6/2021 | Lasserre | G06T 9/40 |
| 2021/0272327 A1* | 9/2021 | Wang | G06T 1/60 |
| 2021/0350583 A1* | 11/2021 | Lasserre | H03M 7/405 |
| 2021/0407147 A1* | 12/2021 | Flynn | H04N 19/182 |
| 2022/0044358 A1* | 2/2022 | Wang | G06T 3/4046 |
| 2022/0058805 A1* | 2/2022 | Lee | G06F 18/24 |
| 2022/0101489 A1* | 3/2022 | Nie | G06V 10/7715 |
| 2022/0121361 A1* | 4/2022 | Kamran | G06F 3/067 |
| 2022/0164993 A1* | 5/2022 | Llach | G06T 9/001 |
| 2022/0262002 A1* | 8/2022 | Wang | G06T 7/10 |
| 2022/0292728 A1* | 9/2022 | Huang | G06N 3/0455 |
| 2022/0366612 A1* | 11/2022 | Taquet | H04N 19/96 |
| 2022/0394283 A1* | 12/2022 | Cao | H04N 19/136 |
| 2023/0048381 A1* | 2/2023 | Taquet | G06T 9/40 |
| 2023/0072293 A1* | 3/2023 | Koh | G06T 7/10 |
| 2023/0078840 A1* | 3/2023 | Salvi | G06T 17/20 345/423 |
| 2023/0260197 A1* | 8/2023 | Chou | H04N 19/176 345/424 |
| 2023/0410254 A1* | 12/2023 | Wang | G06T 9/002 |
| 2023/0410377 A1* | 12/2023 | Zhang | H04N 19/91 |
| 2024/0037840 A1* | 2/2024 | Ramesh Babu | G06T 17/10 |
| 2024/0062515 A1* | 2/2024 | Oh | G06N 3/04 |
| 2024/0070810 A1* | 2/2024 | Oosake | G16H 30/40 |
| 2024/0127491 A1* | 4/2024 | Mammou | H04N 19/597 |
| 2024/0212164 A1* | 6/2024 | Li | G06T 7/11 |

OTHER PUBLICATIONS

Armeni et al., "3D Semantic Parsing of Large-Scale Indoor Spaces," CVPR paper, 2016.

Boulch, "ConvPoint: Continuous Convolutions for Point Cloud Processing," Feb. 19, 2020.

Boulch et al., "FKAConv: Feature-Kernel Alignment for Point Cloud Convolution," ACCV, 2020.

Chen et al., "DeepLab: Semantic Image Segmentation with Deep Convolutional Nets, Atrous Convolution, and Fully Connected CRFs," May 12, 2017.

Chen et al., "LSANet: Feature Learning on Point Sets by Local Spatial Aware Layer," Jun. 20, 2019.

Dai et al., "Attentional Feature Fusion," Nov. 9, 2020.

Dovrat et al., "Learning to Sample," Apr. 1, 2019.

Engelmann et al., "Exploring Spatial Context for 3D Semantic Segmentation of Point Clouds," Dec. 18, 2019.

Fan et al., "SCF-Net: Learning Spatial Contextual Features for Large-Scale Point Cloud Segmentation," CVPR, 2021.

Hackel et al., "Semantic3D.net: A new Large-scale Point Cloud Classification Benchmark," Apr. 12, 2017.

Hu et al., "RandLA-Net: Efficient Semantic Segmentation of Large-Scale Point Clouds," May 1, 2020.

Hu et al., "RandLA-Net: Efficient Semantic Segmentation of Large-Scale Point Clouds," CVPR 2020, May 1, 2020.

Hua et al., "Pointwise Convolutional Neural Networks," Mar. 29, 2018.

Huang et al., "Recurrent Slice Networks for 3D Segmentation of Point Clouds," 2018 IEEE/CVF Conference on Computer Vision and Pattern Recognition, 2018.

Jiang et al., "PointSIFT: A SIFT-like Network Module for 3D Point Cloud Semantic Segmentation," Nov. 24, 2018.

Kamnitsas et al., "Efficient multi-scale 3D CNN with fully connected CRF for accurate brain lesion segmentation," Feb. 2017.

Komarichev et al., "A-CNN: Annularly Convolutional Neural Networks on Point Clouds," Apr. 16, 2019.

Lan et al., "Modeling Local Geometric Structure of 3D Point Clouds using Geo-CNN," Nov. 19, 2018.

Landrieu et al., "Point Cloud Oversegmentation with Graph-Structured Deep Metric Learning," Apr. 3, 2019.

Landrieu et al., "Large-scale Point Cloud Semantic Segmentation with Superpoint Graphs," Mar. 28, 2018.

Lang et al., "SampleNet: Differentiable Point Cloud Sampling," Apr. 4, 2020.

Li et al., "PointCNN: Convolution on X-Transformed Points," Nov. 5, 2018.

Liu et al., "Path Aggregation Network for Instance Segmentation," Sep. 18, 2018.

Liu et al., "A Closer Look at Local Aggregation Operators in Point Cloud Analysis," 2020.

Lu et al., "CGA-Net: Category Guided Aggregation for Point Cloud Semantic Segmentation," CVPR, 2021.

Ma et al. "Multi-Scale Point-Wise Convolutional Neural Networks for 3D Object Segmentation From LiDAR Point Clouds in Large-Scale Environments," IEEE Transactions on Intelligent Transportation Systems, 2019.

Mao et al., "Interpolated Convolutional Networks for 3D Point Cloud Understanding," Aug. 13, 2019.

Maturana et al., "VoxNet: A 3D Convolutional Neural Network for Real-Time Object Recognition," 2015.

Nie et al., "Bidirectional Pyramid Networks for Semantic Segmentation," ACCV, 2020.

Qi et al., "PointNet: Deep Learning on Point Sets for 3D Classification and Segmentation," Apr. 10, 2017.

Qi et al., "PointNet++: Deep Hierarchical Feature Learning on Point Sets in a Metric Space," Jun. 7, 2017.

Qiu et al., "Semantic Segmentation for Real Point Cloud Scenes via Bilateral Augmentation and Adaptive Fusion," Apr. 13, 2021.

Riegler et al., "OctNet: Learning Deep 3D Representations at High Resolutions," Apr. 10, 2017.

Ronneberger et al., "U-Net: Convolutional Networks for Biomedical Image Segmentation," May 18, 2015.

Roynard et al., "Classification of Point Cloud Scenes with Multiscale Voxel Deep Network," Apr. 10, 2018.

Roynard et al., "Paris-Lille-3D: a large and high-quality ground truth urban point cloud dataset for automatic segmentation and classification," Apr. 10, 2018.

Su et al., "SPLATNet: Sparse Lattice Networks for Point Cloud Processing," May 9, 2018.

Sun et al., "Oriented Point Sampling for Plane Detection in Unorganized Point Clouds," May 4, 2019.

Sun et al., "High-Resolution Representations for Labeling Pixels and Regions," Apr. 9, 2019.

Tan et al., "EfficientDet: Scalable and Efficient Object Detection," Jul. 27, 2020.

Tao et al, "Hierarchical multi-scale attention for semantic segmentation," May 21, 2020.

Tatarchenko et al., "Tangent Convolutions for Dense Prediction in 3D," Jul. 6, 2018.

Thomas et al., "Semantic Classification of 3D Point Clouds with Multiscale Spherical Neighborhoods," Aug. 1, 2018.

(56) References Cited

OTHER PUBLICATIONS

Thomas et al., "KPConv: Flexible and Deformable Convolution for Point Clouds," ICCV, 2019.
Wang et al., "Deep High-Resolution Representation Learning for Visual Recognition," Mar. 13, 2020.
Wang et al., "Graph Attention Convolution for Point Cloud Semantic Segmentation," 2019.
Wang et al., "Non-local Neural Networks," 2018.
Woo et al., "CBAM: Convolutional Block Attention Module," Jul. 18, 2018.
Wu et al., "PointConv: Deep Convolutional Networks on 3D Point Clouds," Nov. 9, 2020.
Xu et al., "PAConv: Position Adaptive Convolution with Dynamic Kernel Assembling on Point Clouds," Apr. 26, 2021.
Yang et al., "Modeling Point Clouds with Self-Attention and Gumbel Subset Sampling," Apr. 6, 2019.
Ye et al., "Learning with Noisy Labels for Robust Point Cloud Segmentation," 2021.
Ye et al., "3D Recurrent Neural Networks with Context Fusion for Point Cloud Semantic Segmentation," ECCV 2018 paper, 2018.
Yu et al., "Deep Layer Aggregation," Jan. 4, 2019.
Zhang et al., "ShellNet: Efficient Point Cloud Convolutional Neural Networks using Concentric Shells Statistics," Aug. 17, 2019.
Zhao et al., "Pyramid Scene Parsing Network," Apr. 27, 2017.
Zhao et al., "PointWeb: Enhancing Local Neighborhood Features for Point Cloud Processing," 2019.
Kang et al., "PyramNet: Point Cloud Pyramid Attention Network and Graph Embedding Module for Classification and Segmentation," Sep. 30, 2019.

\* cited by examiner

Table 1. Comparing pyramid architecture (KP-Pyramid) with U-shape architecture (original KPConv), using the standard mIoU metric. As can be clearly seen, the pyramid architecture provides a substantial improvement in accuracy, consistently aross all three datasets, and for both rigid and deformable settings of KPConv.

| Methods | PL3D | S3DIS | Semantic3D |
|---|---|---|---|
| KPConv rigid | 77.8 | 69.1 | 74.6 |
| KP-Pyramid rigid | 80.5 | 71.7 | 76.4 |
| $\Delta$mIoU | +2.7 | +2.6 | +1.8 |
| KPConv deform | 81.2 | 70.6 | 73.1 |
| KP-Pyramid deform | 83.0 | 73.0 | 75.8 |
| $\Delta$mIoU | +1.8 | +2.4 | +2.7 |

Table 2. Investigation of tridirectional information flow. All three types of information flow (link) provide boost in performance. Results are computed under the same setting.

| method | fusion strategy | mIoU | $\Delta$mIoU |
|---|---|---|---|
| BaseNet | - | 66.0 | - |
| +lateral | - | 66.6 | +0.6 |
| +lateral+downward | CLAIM | 67.6 | +1.6 |
| +lateral+upward | CLAIM | 67.2 | +1.2 |
| +pyramidal | CLAIM | 68.2 | +2.2 |

FIG. 4

PYRAMID ARCHITECTURE FOR MULTI-SCALE PROCESSING IN POINT CLOUD SEGMENTATION

TECHNICAL FIELD

The disclosure relates generally to a network architecture for semantic segmentation of point cloud data.

BACKGROUND

Semantic segmentation of point cloud data is a critical task for many applications in robotics such as intelligent vehicles (autonomous driving), autonomous mapping, and navigation. Recent advances in point cloud segmentation are mainly driven by new designs of local aggregation operators and point sampling methods. Unlike image segmentation, few efforts have been made to understand the fundamental issue of scale (e.g., the level of feature resolution) and how scales should interact and be fused.

SUMMARY

Various embodiments of the present specification may include a network architecture for efficient semantic segmentation of point cloud data and a method of utilizing such network architecture.

According to one aspect, a cross-scale point cloud segmentation network architecture for semantic segmentation of a point cloud is described. The network architecture may include an encoding path comprising a plurality of sequentially connected encoding nodes; a decoding path following the encoding path and comprising a plurality of sequentially connected decoding nodes, and a plurality of data links respectively corresponding to a plurality of levels of feature resolution, in which each of the plurality of data links connects one of the plurality of encoding nodes and one of the plurality of decoding nodes that have a same level of feature resolution. In some embodiments, each encoding node decreases a feature resolution of an input of the encoding node, and each decoding node increases a feature resolution of an input of the decoding node. In some embodiments, at least one of the plurality of data links connects a first encoding node and a first decoding node and comprises one or more intermediate nodes between the first encoding node and the first decoding node, and at least one of the one or more intermediate nodes aggregates inputs from (1) a preceding intermediate node on the at least one data link corresponding to a baseline feature resolution, (2) an intermediate node on a first neighboring data link corresponding to a lower level of feature resolution than the baseline feature resolution, and (3) an intermediate node on a second neighboring data link corresponding to a higher level of feature resolution than the baseline feature resolution. The least one of the one or more intermediate nodes then generates an output based on the aggregated inputs and feeds the output into a next intermediate node towards a direction to the first decoding node.

In some embodiments, when the at least one of the one or more intermediate nodes is a first intermediate node on the at least one data link, the first intermediate node is configured to: receive a first input from a first node on the at least one data link, wherein the first node is the first encoding node connected by the data link; receive a second input from a second node on the first neighboring data link corresponding to the lower level of feature resolution; receive a third input from a third node on the second neighboring data link corresponding to the higher level of feature resolution; and generate the output based on the first input, the second input, and the third input.

In some embodiments, the second node is an encoding node following the first encoding node on the encoding path.

In some embodiments, the third node is an intermediate node on the second neighboring data link corresponding to the higher level of feature resolution.

In some embodiments, the at least one intermediate node on the at least one data link corresponding to the baseline feature resolution is further configured to: feed the output to an intermediate node on the first neighboring data link corresponding to the lower level of feature resolution than the baseline feature resolution.

In some embodiments, the at least one intermediate node on the at least one data link corresponding to the baseline feature resolution is further configured to: feed the output to an intermediate node on the second neighboring data link corresponding to the higher level of feature resolution than the baseline feature resolution.

In some embodiments, each of the plurality of encoding nodes is configured to perform subsampling to decrease the feature resolution.

In some embodiments, each of the plurality of decoding nodes is configured to perform upsampling to increase the feature resolution.

In some embodiments, the first decoding node is configured to: receive a fourth input from a preceding decoding node on the decoding path; receive a fifth input from a last intermediate node on the at least one data link; receive a sixth input from a last intermediate node on the second neighboring data link corresponding to the higher feature resolution than the at least one data link; and perform a feature fusion based on the fourth input, the fifth input, and the sixth input and feed a fusion result into a second decoding node that is subsequent to the first decoding node on the decoding path.

In some embodiments, a first data link comprises more intermediate nodes than a second data link when the encoding node connected by the first data link has a higher feature resolution than the encoding node connected by the second data link.

In some embodiments, the first input has a base feature resolution, the second input has a lower feature resolution than the base feature resolution and richer semantic information, and the third input has a higher feature resolution than the base feature resolution and richer detail information.

In some embodiments, to generate the output based on the first input, the second input, and the third input, the first intermediate node is further configured to: compute a semantic mask by applying a vector product operation on the first input and the second input; compute a resolution mask by applying a vector addition operation on the first input and the third input; transform the second input by applying the semantic mask; transform the third input by applying the resolution mask; transform the first input by applying a local aggregation on the first input; and aggregate the first transformed input, the second transformed input, and the third transformed input to obtain the output.

In some embodiments, prior to computing the semantic mask and the resolution mask, the first intermediate node is further configured to: compress the first input, the second input, and the third input into a single-channel format using a multi-layer perceptron (MLP).

In some embodiments, the semantic mask is computed by applying a sigmoid activation on an output of the vector product operation.

In some embodiments, the resolution mask is computed by applying a sigmoid activation on an output of the vector addition operation.

In some embodiments, to aggregate the first transformed input, the second transformed input, and the third transformed input, the first intermediate node is further configured to: stack the first transformed input, the second transformed input, and the third transformed input to obtain multi-scale features; and apply a multi-layer perceptron (MLP) to reduce channels of the multi-scale feature.

According to another aspect, a computer-implemented method for point cloud segmentation is described. The method includes feeding a plurality of features extracted from an input point cloud into a point cloud segmentation network. The point cloud segmentation network may include: an encoding path comprising a plurality of sequentially connected encoding nodes, wherein each encoding node decreases a feature resolution of an input of the encoding node; a decoding path following the encoding path and comprising a plurality of sequentially connected decoding nodes, wherein each decoding node increases a feature resolution of an input of the decoding node; a plurality of data links respectively corresponding to a plurality of levels of feature resolution, in which each of the plurality of data links connects one of the plurality of encoding nodes and one of the plurality of decoding nodes that have a same level of feature resolution. At least one of the plurality of data links connects a first encoding node and a first decoding node and includes one or more intermediate nodes between the first encoding node and the first decoding node, and the at least one data link corresponds to a baseline feature resolution and exchanges data with (1) a first neighboring data link corresponding to a lower level of feature resolution than the baseline feature resolution and (2) a second neighboring data link corresponding to a higher level of feature resolution than the baseline feature resolution through the one or more intermediate nodes. The method may further include obtaining an output from a last decoding node from the decoding path of the point cloud segmentation network for object classification or part segmentation.

According to yet another aspect, a non-transitory computer-readable storage medium for point cloud segmentation is described. The non-transitory computer-readable storage medium is configured with instructions executable by one or more processors to cause the one or more processors to perform operations including: feeding a plurality of features extracted from an input point cloud into a point cloud segmentation network. The point cloud segmentation network may include: an encoding path comprising a plurality of sequentially connected encoding nodes, wherein each encoding node decreases a feature resolution of an input of the encoding node; a decoding path following the encoding path and comprising a plurality of sequentially connected decoding nodes, wherein each decoding node increases a feature resolution of an input of the decoding node; a plurality of data links respectively corresponding to a plurality of levels of feature resolution, in which each of the plurality of data links connects one of the plurality of encoding nodes and one of the plurality of decoding nodes that have a same level of feature resolution. At least one of the plurality of data links connects a first encoding node and a first decoding node and comprises one or more intermediate nodes between the first encoding node and the first decoding node, and the at least one data link corresponds to a baseline feature resolution and exchanges data with (1) a first neighboring data link corresponding to a lower level of feature resolution than the baseline feature resolution and (2) a second neighboring data link corresponding to a higher level of feature resolution than the baseline feature resolution through the one or more intermediate nodes. The operations may further include obtaining an output from a last decoding node from the decoding path of the point cloud segmentation network for object classification or part segmentation.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 4 illustrates exemplary experimental results of the pyramid network architecture for cross-scale processing in point cloud segmentation in accordance with some embodiments.

DETAILED DESCRIPTION

Figure 1:
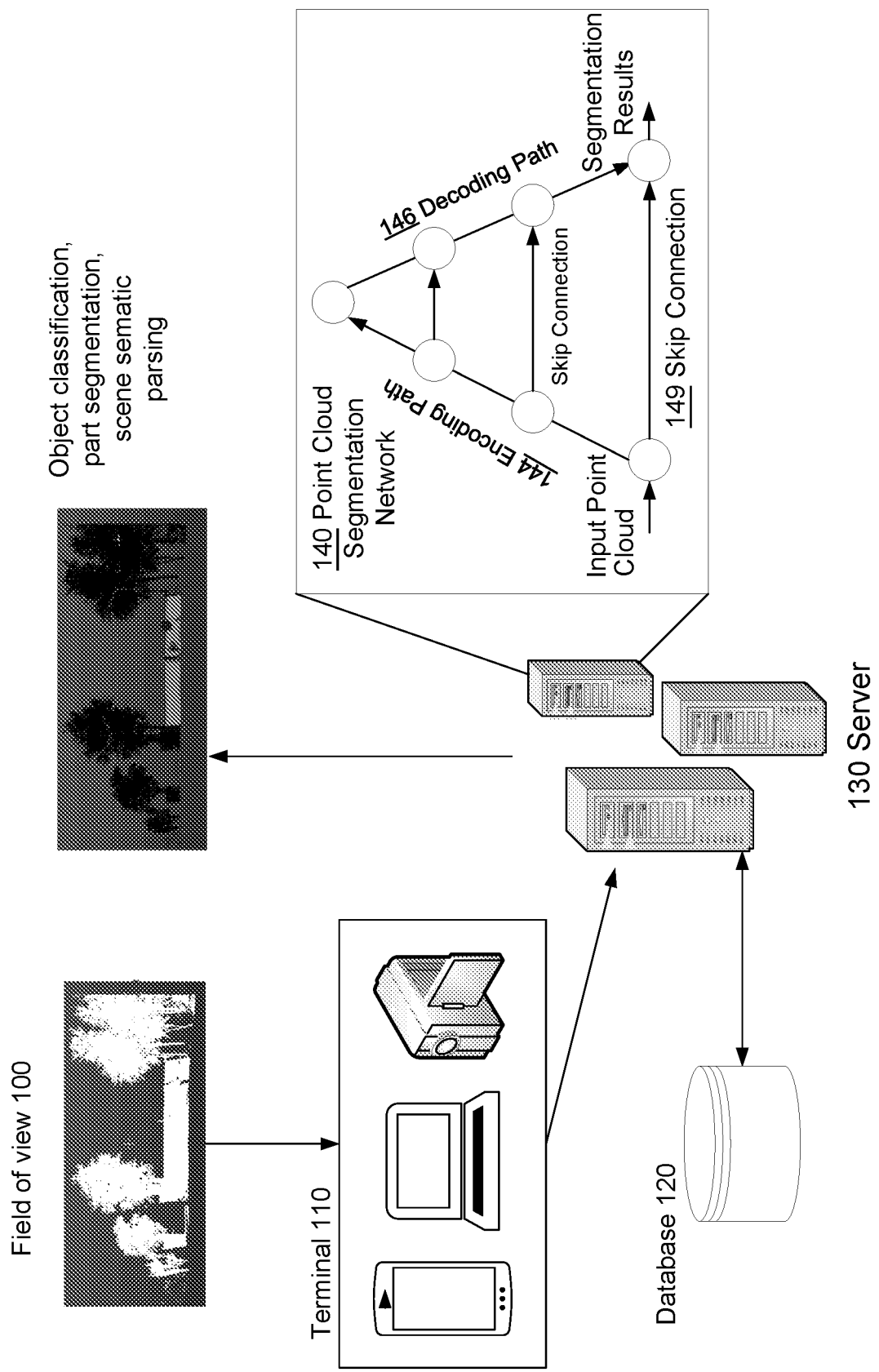
FIG. 1 illustrates an exemplary system diagram of an environment for semantic segmentation of a point cloud using a point cloud segmentation network in accordance with some embodiments.

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

With the rise of autonomous driving, semantic segmentation of point cloud data is increasingly drawing attention in research. Building deep models for point clouds, which include sets of orderless points at arbitrary 3D positions, is arguably different from that for images. Early works projected 3D points to regular structures so that convolution operators could be used. This data projection or transformation, however, renders the resulting data unnecessarily voluminous. In addition, the quantization artifacts introduced during this projection process may obscure natural invariances of the data. Later, the pioneering work of PointNet developed a promising method to directly apply deep learning on sparse 3D points, using shared Multi-Layer Perceptrons (MLPs) to learn per-point features. PointNet and its variants typically include three key components: point-wise transformation, local aggregation, and point sampling. The local aggregation operator plays a similar role for points as the convolution layer does for image pixels; and point sampling works as a pooling layer does for pixels.

Most of the above-described works focused on either local aggregation or point sampling strategies. For example, PointNet++ applied several MLPs on a concatenation of relative position and point features to aggregate information in local neighborhoods. Kernel Point Convolution (KP-Conv) is designed to obtain pseudo grid features and applied convolution on these kernel points. RandLANet compared point sampling methods and selected random sampling for efficiency. Density-adaptive sampling was proposed to handle heterogeneous density distributions and class imbalance.

However, for point cloud segmentation, little attention has been devoted to the study of the network architecture itself. This is in stark contrast with image segmentation, where most recent efforts went way beyond the basic encoder-decoder U-structure to design better and more efficient architectures, especially on the topics of multi-scale processing and fusion and context aggregation. For example, High-Resolution Net (HRNet) proposed to aggregate multi-scale features throughout lateral stages, with an emphasis on high-resolution representation. Hierarchical Attention was also built upon better uses of multi-scale information, from a perspective of inference.

Point cloud data are multi-scale in nature and may fit well with multi-scale (also called cross-scale) data processing. Here, the scales may refer to the different levels of feature resolution. A tensor with a higher feature resolution may contain more fine details, whereas a tensor with a lower resolution may contain richer contextual (or semantic) information. The multi-scale processing may satisfy the need to balance large-scale context with fine details, as well as fully exploit the multiple local aggregation stages for extracting semantic information. The following description introduces a pyramid architecture for multi-scale/cross-scale point cloud segmentation.

The pyramid network architecture for multi-scale/cross-scale point cloud segmentation brings various technical improvements.

For example, the pyramid network architecture introduces lateral stages (also called intermediate nodes) on skip connections or data links that link up counterparts in the encoder and decoder paths at each feature resolution level (e.g., at each scale), where neighboring data are reused in local aggregation and sampling. This approach effectively compensates the feature data at the current scale with richer contextual information and fine details from neighboring scales, without introducing extra computational costs (as the neighboring feature data are already computed along the encoding and decoding paths).

As another example, in addition to the lateral stages, the pyramid network architecture further introduces upward/downward links to form a full "pyramid" shape that allows information to be fused across two or more scales or stages.

As yet another example, the pyramid network architecture further introduces an intelligent Cross-scaLe Attention fusIon Module (CLAIM) for performing the aggregation/fusion of the multi-scale features. The CLAIM module is designed to be almost parameter-free and thus ultra-lightweight to facilitate deployment of the pyramid network architecture in an edge computing environment. The CLAIM module implements an algorithm that treats the feature data from different scales in different ways, so that it preserves the various information according to their respective natures. For instance, contextual features from a lower feature resolution level (a lower scale) and fine detail features from a higher feature resolution level (a higher scale) are respectively fused with feature data on the current scale in different ways.

As yet another example, the pyramid network architecture is compatible with existing networks with an encoder-decoder structure or U-structure. It means, the pyramid network architecture may be conveniently added (as software features) to point cloud segmentation networks that are already deployed without incurring significant development and deployment cost.

FIG. 1 illustrates an exemplary system diagram of an environment for semantic segmentation of a point cloud using a point cloud segmentation network in accordance with some embodiments. The environment illustrated in FIG. 1 may include hardware devices such as one or more terminal devices 110 (e.g., smart devices, laptops, cameras, image sensors, or even a smart vehicle or an in-vehicle or on-vehicle device), a server 130 (e.g., an on-prem server, a cloud server), and a database 120. Even though the hardware devices are separated in FIG. 1, they may be co-located or partially co-located in different scenarios. For instance, one or more of the terminal devices 110, server 130, and database 120 may be installed in an autonomous driving vehicle. In some embodiments, the server 130 may be connected to the terminal device 110 through a network, and may be used for providing a service (such as a game service, an application service, a map or navigation service, or autonomous driving) for the terminal or a client installed on the terminal devices 110. The database 120 may be configured on the server 130 or independently of the server 130, and may be used for providing a data storage service for the server 130. The foregoing network includes, but is not limited to, a wide area network, a metropolitan area network, or a local area network.

In some embodiments, the terminal devices 110 may capture a field of view 100 of its surrounding environment or a target area in a form of a point cloud. A point cloud is a set of data points in space. The points may represent a 3D shape or object. Each point position has its set of Cartesian coordinates (X, Y, Z) plus extra feature channels such as color, normal, etc. The captured point cloud may be sent to the server 130 for processing, such as feature extraction, feature encoding and decoding, etc. The output of the process may be used for object classification, part segmentation, and scene sematic parsing of the field of view 100. The point cloud and intermediate computing results may be stored in the database 120.

In some embodiments, the server 130 may feed the point cloud into a point cloud segmentation network 140 for semantic segmentation. The point cloud segmentation network 140 may include an encoding path 144 followed by a decoding path 146. In some embodiments, the encoding path 144 includes a plurality of encoding nodes (or encoding layers, like layers in a neural network) and the decoding path includes a plurality of decoding nodes (or decoding layers, or layers in a neural network).

In some embodiments, the encoding nodes on the encoding path 144 may include transformation layers for learning increasingly sophisticated per-point features, local aggregation layers for combining information in local neighborhoods (each point's neighbors), and point subsampling layers for point subsampling which further increases the receptive fields. As such, the encoding nodes on the encoding path 144 may gradually gain more contextual or semantic information at the cost of losing a certain amount of detailed information at each subsampling step. For instance, one encoding node may reduce the spatial resolution of an input feature map to learn more abstract features. On the other hand, the decoding nodes on the decoding path 146 may be configured to perform per-point transformation and gradually decrease the receptive field by upsampling its input data. However, the decoding nodes may be unable to reconstruct the detailed information lost during the process of subsampling (i.e., during the encoding process). To address this issue, lateral skip connections 149 (also called data links) may be constructed to connect the plurality of encoding nodes and the plurality of decoding nodes. Each skip connection 149 may connect an encoding node and a decoding node that have a same feature resolution (on the same scale). This way, the detailed information received by the encoding node may be transferred to the corresponding decoding node through the lateral skip connection 149 before the subsampling, and the decoding node may recover the spatial resolution of the input image from the encoding node in order to generate dense prediction maps.

However, although the point cloud segmentation network architecture 140 as shown in FIG. 1 may compensate for the data loss within the same scale (also called feature resolution), it fails to fully utilize the information across different scales. Since information from different scales may have different levels of contextual/semantic details, aggregating and fusing them may provide a more comprehensive view of the data being processed at the current scale. Some embodiments described below further enhance the network architecture by introducing intermediate nodes on the skip connections.

Figure 2:
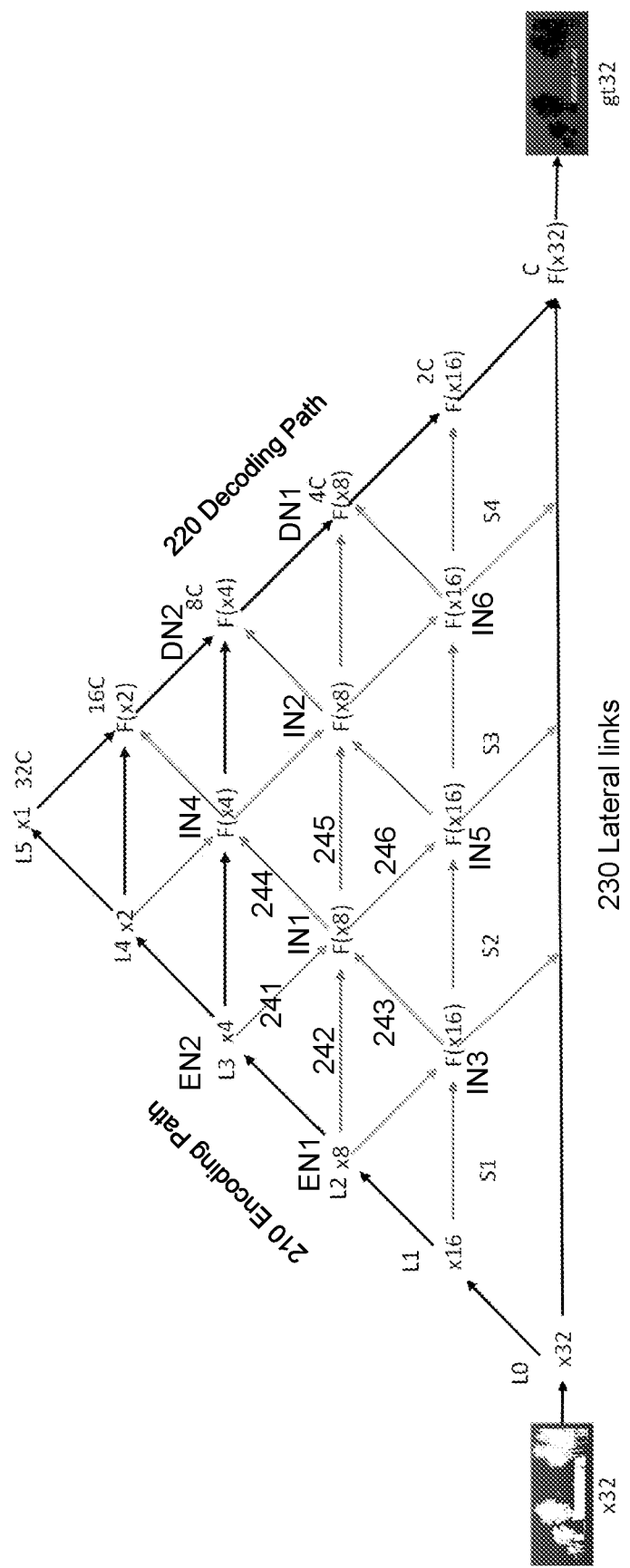
FIG. 2 illustrates a pyramid network architecture for cross-scale processing in point cloud segmentation in accordance with some embodiments.

FIG. 2 illustrates a pyramid network architecture 200 for cross-scale processing in point cloud segmentation in accordance with some embodiments. The pyramid network architecture 200 highlights the core pyramid structure, but may have simplified other steps such as feature extraction and preliminary feature transformation from the input point cloud, and post-processing feature transformation of the output of the pyramid network architecture 200 before eventually generating the final dense prediction for the object classification, part segmentation, or scene sematic parsing of the input point cloud.

As shown in FIG. 2, the pyramid network architecture 200 may include an encoding path 210 and a decoding path 220. The decoding path 220 may follow the encoding path 210. In some embodiments, the encoding path 220 may include a plurality of sequentially connected encoding nodes, and each encoding node may perform subsampling to decrease the feature resolution of an input to the encoding node and learn more abstract features (e.g., high-level contextual information) of objects in the input. For instance, while the high-resolution input contains information about the edges and corners of an object, the subsampled data may "zoom out" to learn a shape based on the edges and corners. For instance, assuming the feature resolution of the lowest layer (corresponding to the first encoding node) in the pyramid network architecture 200 is x32 (with x being an arbitrary integer), the second-lowest layer (corresponding to the second encoding node) in the pyramid network architecture 200 is reduced to x16, and the encoding path may keep reducing the feature resolution by half at each encoding node. Similarly, the decoding path 220 may include a plurality of sequentially connected decoding nodes. Each decoding node recovers the feature resolution of its input by upsampling. Note that the encoding nodes on the encoding path 210 and the decoding nodes on the decoding path 220 are respectively connected by a plurality of data links or lateral links 230. The nodes on the same link 230 have the same feature resolution. The nodes on a higher level link in the pyramid network architecture 200 have a smaller feature resolution but a greater number of channels than the nodes on a lower level link in the pyramid network architecture 200 do. In some embodiments, the height of the pyramid network architecture 200 may vary depending on the length of the encoding path 210 and the decoding path 220 of the pyramid network architecture 200.

Each of the plurality of lateral links 230 connects one of the plurality of encoding nodes and one of the plurality of decoding nodes that have a same level of feature resolution. In some embodiments, each lateral link 230 has multiple stages represented as multiple intermediate nodes on the link. As shown in FIG. 2, the lateral link corresponding to feature resolution x16 connects one encoding node and one decoding node, as well as three intermediate nodes. In some embodiments, each intermedia node on a lateral link involves a local aggregation operation so that the lateral (horizontal) information flow may have an increasingly large receptive field but also keep the spatial resolution without losing detail. The local aggregation may not only aggregate the information flown from the lateral preceding node, but also the information from nodes on the neighboring lateral links. This architecture is designed to boost cross-scale interaction.

As such, the information in the pyramid network architecture 200 may flow in three directions: one moves forward (e.g., arrows 242 and 245) in stages, maintaining spatial resolution while applying local aggregation operations to integrate information; one moves "down" in levels (e.g., arrows 241 and 246), adding larger-scale context to finer-scale detail; the third moves "up" (arrows 243 and 244) in levels, from higher spatial resolution (spatial feature resolution in 3D data points) to lower resolution, providing richer detailed information for larger contexts.

Lateral Information Flow

Different from typical skip links in other neural network architectures, the lateral links 230 in the pyramid network architecture 200 have a varying number of intermediate nodes or stages. An exemplary instantiation of the pyramid network architecture 200 may include 4 or 5 layers (3 or 4 steps of subsampling), and there may be 3 or 4 intermediate nodes of local aggregation at the first layer of the pyramid network architecture 200. Fewer local aggregation steps are needed laterally as moving up the layers, as the incoming information already passes through a number of local aggregation operations in the subsampling process. Assuming the input resolution is x32 at the lowest lever of the pyramid architecture network 200, FIG. 2 shows that the lateral link corresponding to the resolution x16 (i.e., L1) has three stages or intermediate nodes to learn better features and to enlarge the effective receptive field. Because the spatial feature resolution (e.g., number of points) remains the same, such a lateral link may learn high-resolution representation, especially in lower layers (e.g., L1). In some embodiments, the lateral links for deep layers (e.g., higher levels such as L4) do not perform local aggregation since the gain of semantics is minimal.

Cross-Scale Information Flows

The first cross-scale information flow includes a top-down information flow (the data flows labeled with arrows 241 and 246) and a bottom-up information flow (the data flows labeled with arrows 243 and 244). The top-down flows in the pyramid network architecture 200 enhance processing at lower layers (higher resolution) with more contextual and semantic information from higher layers, and the bottom-up flows in the pyramid network architecture 200 compensate for the lost detailed information (e.g., the edges or corners of a 3D object) at a higher layer (lower resolution).

Taking the pyramid network architecture 200 in FIG. 2 as an example, the lateral link L2 connects a first encoding node (EN1) and a first decoding node (DN1) and comprises one or more intermediate nodes (IN1 and IN2) between the EN1 and the DN1. The intermediate node IN1 receives inputs from (1) a preceding node (EN1) on the current lateral link L2 corresponding to a baseline feature resolution (x8), (2) a node on another data link corresponding to a lower level of feature resolution than the baseline feature resolution, referring to the encoding node EN2 after EN1 on the lateral link L3 corresponding to feature resolution x4, and (3) a node on another data link corresponding to a higher level of feature resolution than the baseline feature resolution, referring to the intermediate node IN3 on the lateral link L1 corresponding to feature resolution x16. Based on the three-way inputs, the intermediate node IN1 generates an output and feeds the output into a next intermediate node IN2 towards a direction to the first decoding node DN1.

In some embodiments, the fusion output generated by the intermediate node IN1 is not only fed into the next intermediate node IN2 on the current lateral link, but also other intermediate nodes or decoding nodes on the neighboring lateral links. For instance, the output from IN1 is fed into IN2 on the current lateral link L2, as well as IN4 on the lateral link L3 with a lower feature resolution and IN5 on the lateral link L1 with a higher feature resolution.

With the multi-stage lateral links, a decoding node on the decoding path 220 may receive inputs from (1) its preceding decoding node (having a lower feature resolution) on the decoding path 220, (2) input from a last intermediate node on the lateral link linking the decoding node (thus having the same feature resolution), and (3) input from a last intermediate node on another lateral link having the higher feature resolution. For instance, the decoding node DN1 receives input from its preceding decoding node DN2 (with a lower resolution but richer contextual information), input from the last intermediate node IN2 on the current lateral link L2, and input from the last intermediate node IN6 from the lateral link L1 having a higher feature resolution. In some embodiments, the last decoding node in the decoding path may generate an output, which may go through a feature transformation for the object classification, part segmentation, or scene sematic parsing of the input point cloud.

As shown, nodes in the pyramid network architecture 200 may receive inputs from other lateral links corresponding to different feature resolutions. The fusion logic to be executed by these nodes may take into account the nature of the cross-scale inputs, and treat them differently based on their different feature resolutions in order to optimize the information extraction and retention.

Figure 3:
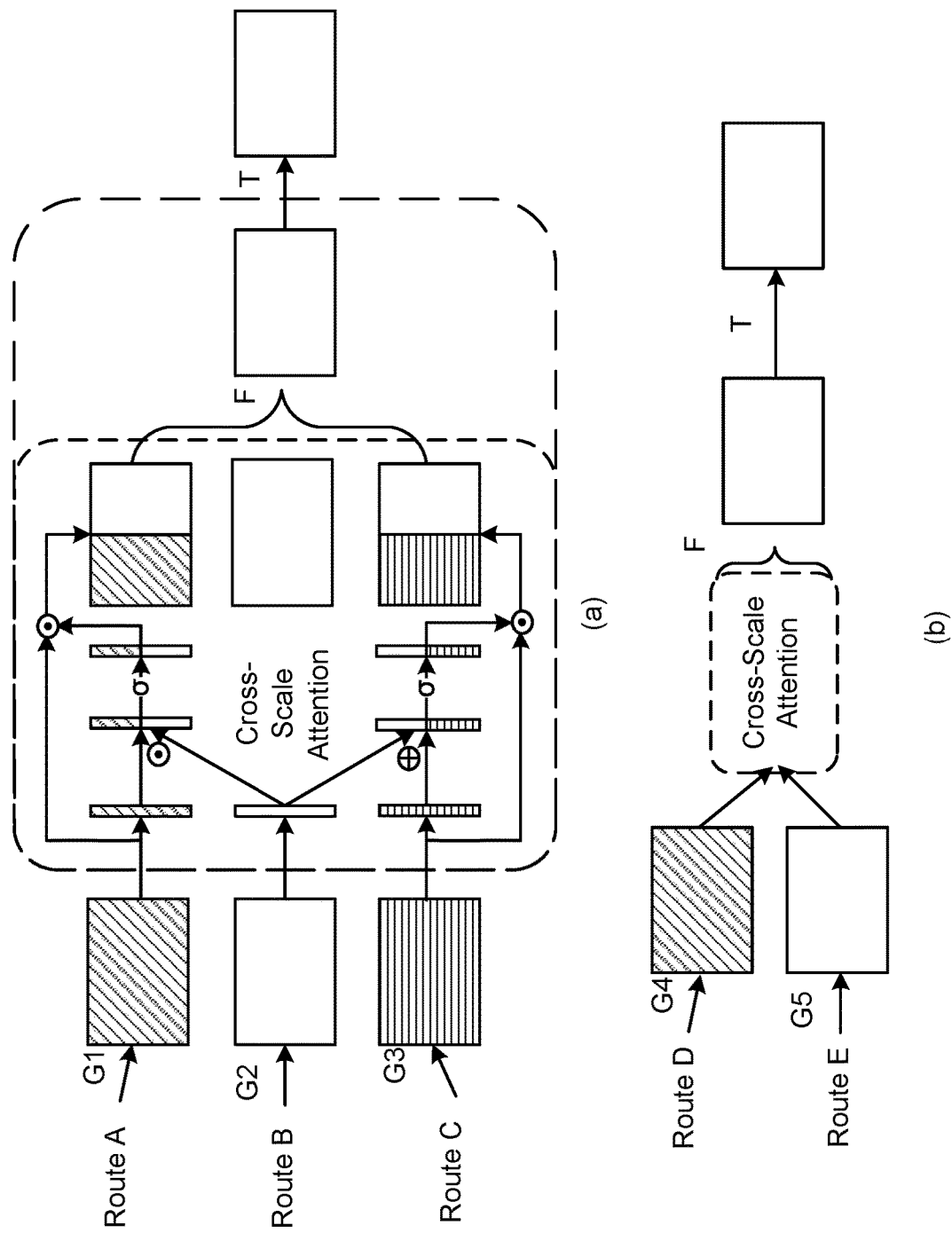
FIG. 3 illustrates exemplary fusion logic in the pyramid network architecture for cross-scale processing in point cloud segmentation in accordance with some embodiments.

FIG. 3 illustrates exemplary fusion logic in the pyramid network architecture for cross-scale processing in point cloud segmentation in accordance with some embodiments. The tri-directional information flow described in FIG. 2 brings together features from different scales with different characteristics. The fusion log to aggregate the cross-scale inputs plays an important role in the design.

In some embodiments, a multi-scale fusion logic may be implemented as an algorithm, which includes three components: pre-fusion transformation (including scale matching), fusion, and post-fusion transformation. As a generalization, for K input vectors at different scales, $s_1, s_2, \ldots s_K$, a base scale $s_m$ may be selected to fuse feature vectors from other scales to this base scale m. Upsampling or downsampling may be adopted to match the base scale and align the spatial dimensions. Transformation operators G (e.g., MLPs or local aggregator (LA) or identity mapping (IM)) may be applied to each of these scales, a fusing operator F (e.g., concatenation (CAT), element-wise weighted sum (wSUM), element-wise max-pooling (MAX)) may be utilized to aggregate all transformed features, and finally the output feature vector g may be obtained after a transformation function (T) (e.g., MLPs or LA or IM). This process may be denoted as $g=T(F(\{G_i(s_i)|i=1, 2, \ldots, K\}))$.

More details of the fusion logic are illustrated in the diagrams in FIG. 3, which include a diagram (a) corresponding to a three-way case and a diagram (b) corresponding to a two-way case. The three-way case may involve an intermediate node or a decoding node that receives inputs from three different scales (e.g., IN1 in FIG. 2). The two-way case may involve a decoding node that receives input from two different scales (e.g., the last decoding node on the decoding path 220 in FIG. 2).

Referring to the diagram (a) of FIG. 3, besides the features at the base scale B from route B, features A at the higher level (lower feature resolution, representing contextual information) are from route A, and features C at the lower level (higher feature resolution, representing details) are from route C. In some embodiments, the three routes may have different transformation operations, e.g., G1, G2, and G3 for route A, B, C respectively. For example, G1 and G3 may be identify mapping, G2 may be local aggregator (LA). Compared to features in route B, features from route A have richer context information, and features from route C have more details. They have different characteristics and the ideal fusion is to retain the details from route C and keep the semantics from route A.

Note that directly element-wise summing B and C may bring detailed information but may also tend to produce blurred boundaries since context information in B has a low resolution, and intuitively multiplying A and B element-wise allows information both in A and B to reinforce each other, but unique signals in either A or B could be suppressed. Instead, the fusion logic shown in FIG. 3 first squeeze the channels of the features in all three scales (A, B, and C) to a single-channel format using MLPs, then perform an "ADD" (vector addition) operation on B and C, a "MUL" (vector multiplication) operation on B and A, to obtain a pair of spatial-wise attention masks with a sigmoid activation, denoted as a semantic-mask ($M_{Sem}$) and a resolution-mask ($M_{res}$). The two masks may be represented as:

$$M_{Sem}=\sigma(z(A) \cdot z(B))$$

$$M_{res}=\sigma(z(C)+z(B))$$

wherein σ refers to the sigmoid activation applied to the outputs of the vector addition or multiplication operations.

After obtaining the masks, $M_{Sem}$ is applied to A and $M_{res}$ is applied to C so that their own characteristics are enhanced without suffering the above-described shortcomings. Local aggregation operations may be applied to B to achieve even higher semantics. As shown in (a) of FIG. 3, the information from route A and route B passes through a mask-determination phase using "MUL" (vector multiplication) operation, and the information from route A is preserved and fused with information from route B to form a first piece of hybrid information. Similarly, the information from route C and route B also passes through a mask-determination phase using "ADD" (vector addition) operation, and the information from route C is preserved and fused with information from route B to form a second piece of hybrid information. The information from route B goes through a local aggregation to obtain a third piece of information (not hybrid). These three pieces of information may then be fed into the fusing operator F (e.g., CAT or SUM) and then the transformation function T (e.g., MLP, LA, or IM). For instance, the three pieces of information may be stacked together to aggregate multi-scale features, and then fed into an MLP to reduce the channels of the stacked features.

The two-way case illustrated in (b) of FIG. 3 is a subset of the three-way case illustrated in (a) of FIG. 3. Assuming the two input routes include a base-scale input (route E) and a higher-scale input (route D), the fusion process may mirror the above-described process related to route A and route B.

FIG. 4 illustrates exemplary experimental results of the pyramid network architecture for cross-scale processing in point cloud segmentation in accordance with some embodiments. As explained above, the pyramid network architecture is applicable to the existing encoder-decoder based point-cloud segmentation network.

Table 1 in FIG. 4 shows experimental validations of the pyramid architecture on three commonly used point cloud benchmarks, including a variety of indoor and outdoor scenes: (1) Paris-Lille-3D (PL3D), a segmentation challenge, for outdoor mobile scans; (2) S3DIS, for indoor large spaces and (3) Semantic3D, for outdoor fixed scans. PL3D contains more than 2 km of streets in 4 different cities and is an online benchmark. The 160 million points of this dataset are annotated with 10 semantic classes, and 30 million points collected in three cities work as a test set. S3DIS covers six large-scale indoor areas from 3 buildings for a total of 273 million points labeled with 13 classes. For S3DIS, k-fold and Area-5 are used as a test scene to measure the generalization ability of the above-described pyramid architecture. Semantic3D is an online benchmark with several fixed lidar scans of different outdoor scenes, and it has more than 4 billion points with 8 semantic categories.

In the experiments, the official open-source code of KPConv is used as a baseline and KP-Pyramid is an enhanced version of KPConv with the pyramid architecture. Table 1 shows experimental results on all three datasets, comparing the enhanced pyramid architecture (KP-Pyramid, the pyramid version of KPConv) with the U-Shape encoder-decoder baseline (the standard KPConv rigid and the deformed version). In this comparison, to make it fair, we use results from the KPConv open source code with provided settings (evaluated on online servers when needed). Note that the results from the open-source code may be different from those in the paper or in online benchmarks, sometimes higher, other times lower. The settings are mostly kept consistent between the baseline and the pyramid-enhanced network. PL3D and Semantic3D scores are obtained on test datasets. S3DIS scores are obtained using k-fold cross-validation. Endowed with the pyramid structure to process and fuse multi-scale information, the performance on all datasets is improved. On NPM3D, the pyramid structure provides a performance gain of more than 2.2 Mean intersection over union (mIoU) points on average; On S3DIS, the performance gain is up to 2.7 points and on Semantic3D, the average gain is more than 2.0 points. The results show that the proposed pyramid architecture, with better multi-scale processing and fusion, significantly improves the baseline.

Table 2 in FIG. 3 studies the effect of adding links (information flows) within the pyramid architecture. The following networks are compared: (a) BaseNet which is the same architecture as KPConv Deformable; (b) adding lateral links in the intermediate layers of the BaseNet as shown in FIG. 2 which represents the 'lateral' or 'forward' information flow (denoted as '+lateral'); (c) adding only top-down flow in the pyramid network, which is the downward information flow (denoted as '+lateral+downward'); (d) adding only bottom-up flow, which indicates the upward information flow (denoted as '+lateral+upward'), and (e) adding both top-down and bottom-up flows, which completes the pyramid shape with the lateral flows (denoted as '+pyramidal'). As shown in Table 2, '+lateral' provides an improvement of 0.6 mIoU point, showing modest gains by adding a direct link for each scale with more 'convolution' stages. On top of the network with lateral links, both downward and upward information flow can further boost the network to achieve better performance. Compared to upward information flow, downward information flow is more beneficial, which confirms that providing context to high-resolution processing is more important. With both the downward and upward links, the network can enjoy an even larger performance gain, demonstrating the merit of having information flow at every step of the processing, in all forward (lateral), upward and downward directions.

Figure 5:
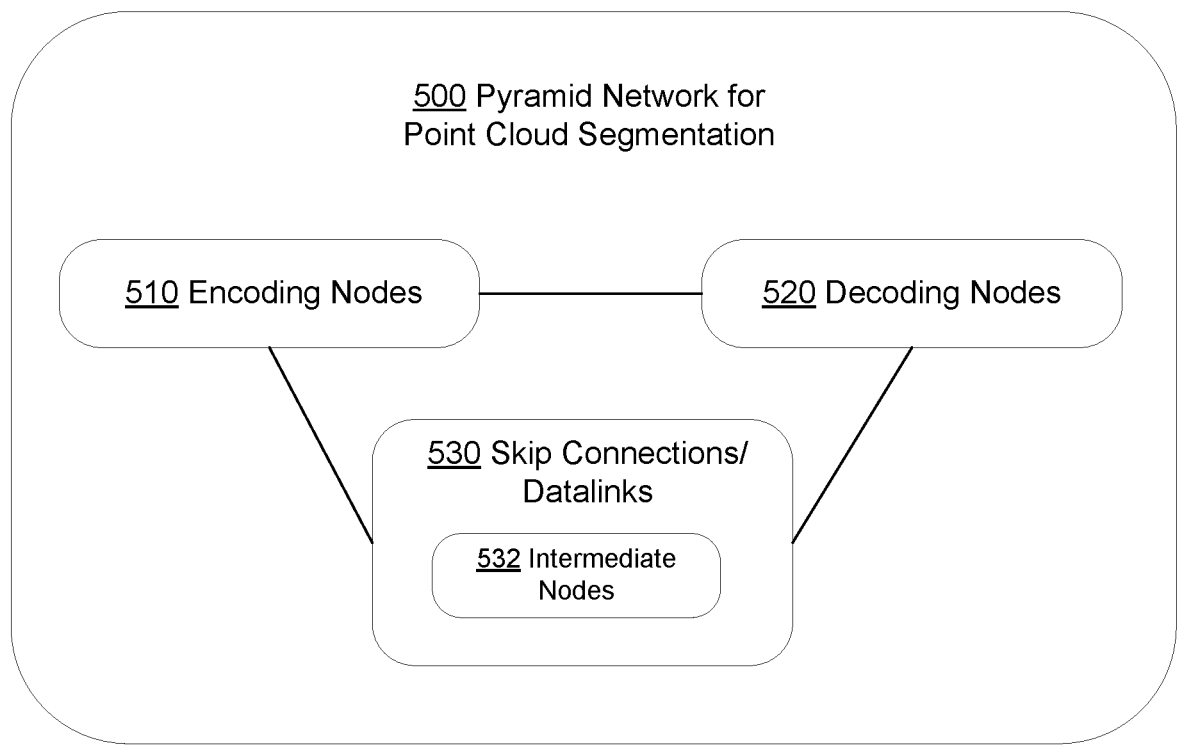
FIG. 5 illustrates an exemplary system diagram of the pyramid network architecture for cross-scale processing in point cloud segmentation in accordance with some embodiments.

FIG. 5 illustrates an exemplary system diagram of the pyramid network architecture 500 for cross-scale processing in point cloud segmentation in accordance with some embodiments. The pyramid network architecture 500 in FIG. 5 is for illustrative purposes only, and may include other components such as feature extraction layers and feature transformation layers.

As shown, the pyramid network architecture 500 may include a plurality of encoding nodes 510 and a plurality of decoding nodes 520, respectively connected by skip connections or data links 530. In some embodiments, the plurality of encoding nodes 510 may be sequentially connected to form an encoding path, the plurality of decoding nodes 520 may be sequentially connected to form a decoding path, and the decoding path follows the encoding path. In some embodiments, each encoding node decreases a feature resolution of an input of the encoding node. In some embodiments, each decoding node increases a feature resolution of an input of the decoding node. In some embodiments, at least one of the plurality of data links connects a first encoding node and a first decoding node and comprises one or more intermediate nodes 532 between the first encoding node and the first decoding node, and at least one of the one or more intermediate nodes 532 aggregates inputs from (1) a preceding node on the at least one data link corresponding to a baseline feature resolution, (2) a node on another data link corresponding to a lower level of feature resolution than the baseline feature resolution, and (3) a node on another data link corresponding to a higher level of feature resolution than the baseline feature resolution, and generates an output based on the aggregated inputs and feeds the output into a next intermediate node towards a direction to the first decoding node.

Figure 6:
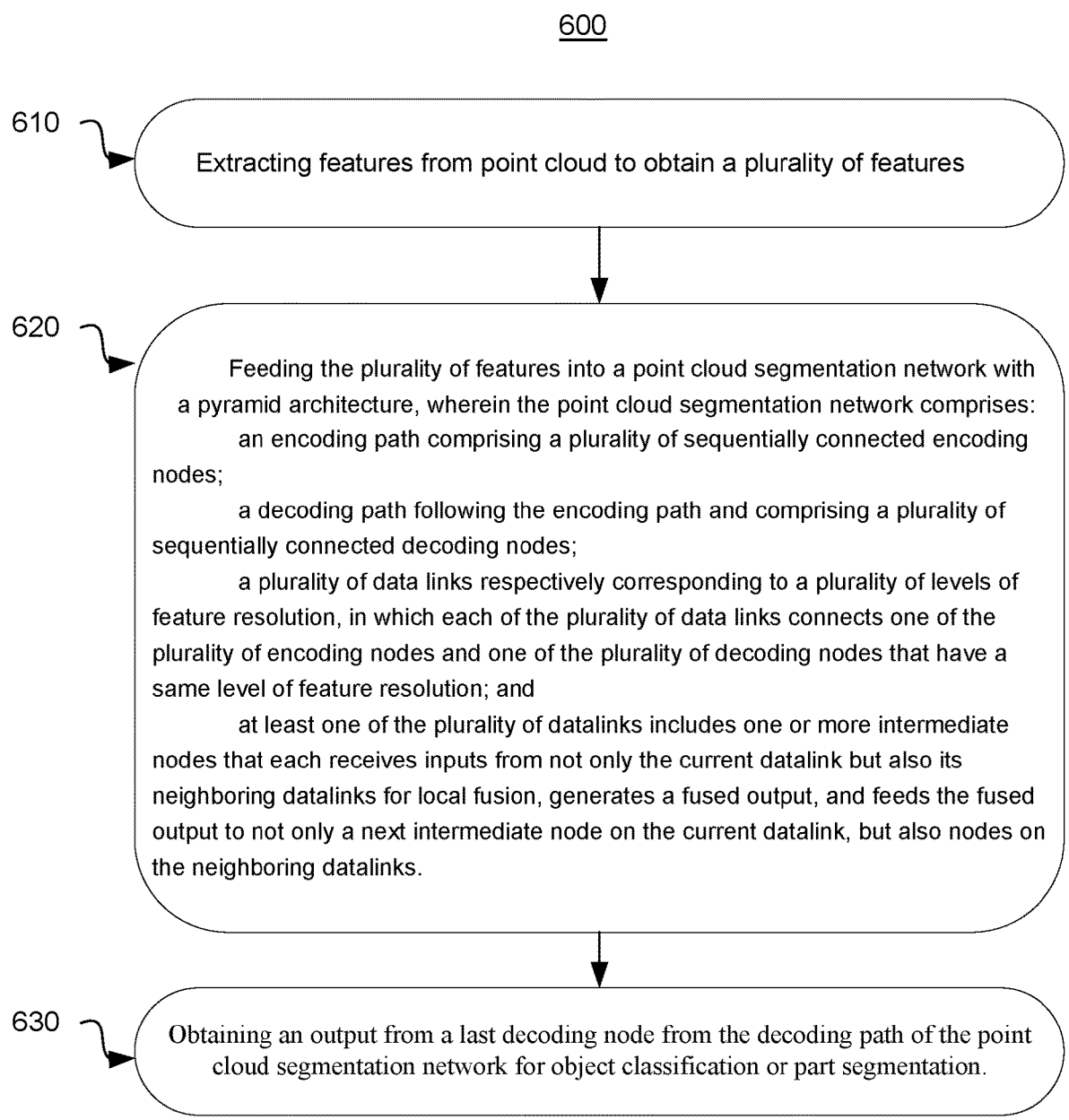
FIG. 6 illustrates an exemplary method of using the pyramid network architecture for cross-scale processing in point cloud segmentation in accordance with some embodiments.

FIG. 6 illustrates an exemplary method 600 of using the pyramid network architecture for cross-scale processing in point cloud segmentation in accordance with some embodiments.

Block 610 of method 600 includes extracting features from point cloud to obtain a plurality of features.

Block 620 of method 600 includes feeding a plurality of features extracted from an input point cloud into a point cloud segmentation network, wherein the point cloud segmentation network comprises: an encoding path comprising a plurality of sequentially connected encoding nodes, wherein each encoding node decreases a feature resolution of an input of the encoding node; a decoding path following the encoding path and comprising a plurality of sequentially connected decoding nodes, wherein each decoding node increases a feature resolution of an input of the decoding node; a plurality of data links respectively corresponding to a plurality of levels of feature resolution, in which each of the plurality of data links connects one of the plurality of encoding nodes and one of the plurality of decoding nodes that have a same level of feature resolution, wherein: at least one of the plurality of data links connects a first encoding node and a first decoding node and comprises one or more intermediate nodes between the first encoding node and the first decoding node, and the at least one data link corresponds to a baseline feature resolution and exchanges data with (1) a first neighboring data link corresponding to a lower level of feature resolution than the baseline feature resolution and (2) a second neighboring data link corresponding to a higher level of feature resolution than the baseline feature resolution through the one or more intermediate nodes.

Block 630 of method 600 includes obtaining an output from a last decoding node from the decoding path of the point cloud segmentation network for object classification or part segmentation.

In some embodiments, when the at least one of the one or more intermediate nodes is a first intermediate node on the at least one data link, and is configured to: receive a first input from a first node on the at least one data link, wherein the first node is the first encoding node connected by the data link; receive a second input from a second node on the first neighboring data link corresponding to the lower level of feature resolution; receive a third input from a third node on the second neighboring data link corresponding to the higher level of feature resolution; and generate the output based on the first input, the second input, and the third input.

In some embodiments, the second node is an encoding node following the first encoding node on the encoding path.

In some embodiments, the third node is an intermediate node on the second neighboring data link corresponding to the higher level of feature resolution.

In some embodiments, the at least one intermediate node on the at least one data link corresponding to the baseline feature resolution is further configured to: feed the output to an intermediate node on the first neighboring data link corresponding to the lower level of feature resolution than the baseline feature resolution.

In some embodiments, the at least one intermediate node on the at least one data link corresponding to the baseline feature resolution is further configured to: feed the output to an intermediate node on the second neighboring data link corresponding to the higher level of feature resolution than the baseline feature resolution.

In some embodiments, each of the plurality of encoding nodes is configured to perform subsampling to decrease the feature resolution.

In some embodiments, each of the plurality of decoding nodes is configured to perform upsampling to increase the feature resolution.

In some embodiments, the first decoding node is configured to: receive a fourth input from a preceding decoding node on the decoding path; receive a fifth input from a last intermediate node on the at least one data link; receive a sixth input from a last intermediate node on the second neighboring data link corresponding to the higher feature resolution than the at least one data link; and perform a feature fusion based on the fourth input, the fifth input, and the sixth input and feed a fusion result into a second decoding node that is subsequent to the first decoding node on the decoding path.

In some embodiments, a first data link includes more intermediate nodes than a second data link when the encoding node connected by the first data link has a higher feature resolution than the encoding node connected by the second data link.

In some embodiments, the first input has a base feature resolution, the second input has a lower feature resolution than the base feature resolution and richer semantic information, and the third input has a higher feature resolution than the base feature resolution and richer detail information.

In some embodiments, to generate the output based on the first input, the second input, and the third input, the first intermediate node is further configured to: compute a semantic mask by applying a vector product operation on the first input and the second input; compute a resolution mask by applying a vector addition operation on the first input and the third input; transform the second input by applying the semantic mask; transform the third input by applying the resolution mask; transform the first input by applying a local aggregation on the first input; and aggregate the first transformed input, the second transformed input, and the third transformed input to obtain the output.

In some embodiments, prior to computing the semantic mask and the resolution mask, the first intermediate node is further configured to: compress the first input, the second input, and the third input into a single-channel format using a multi-layer perceptron (MLP).

In some embodiments, the semantic mask is computed by applying a sigmoid activation on an output of the vector product operation.

In some embodiments, the resolution mask is computed by applying a sigmoid activation on an output of the vector addition operation.

In some embodiments, to aggregate the first transformed input, the second transformed input, and the third transformed input, the first intermediate node is further configured to: stack the first transformed input, the second transformed input, and the third transformed input to obtain multi-scale features; and apply a multi-layer perceptron (MLP) to reduce channels of the multi-scale feature.

Figure 7:
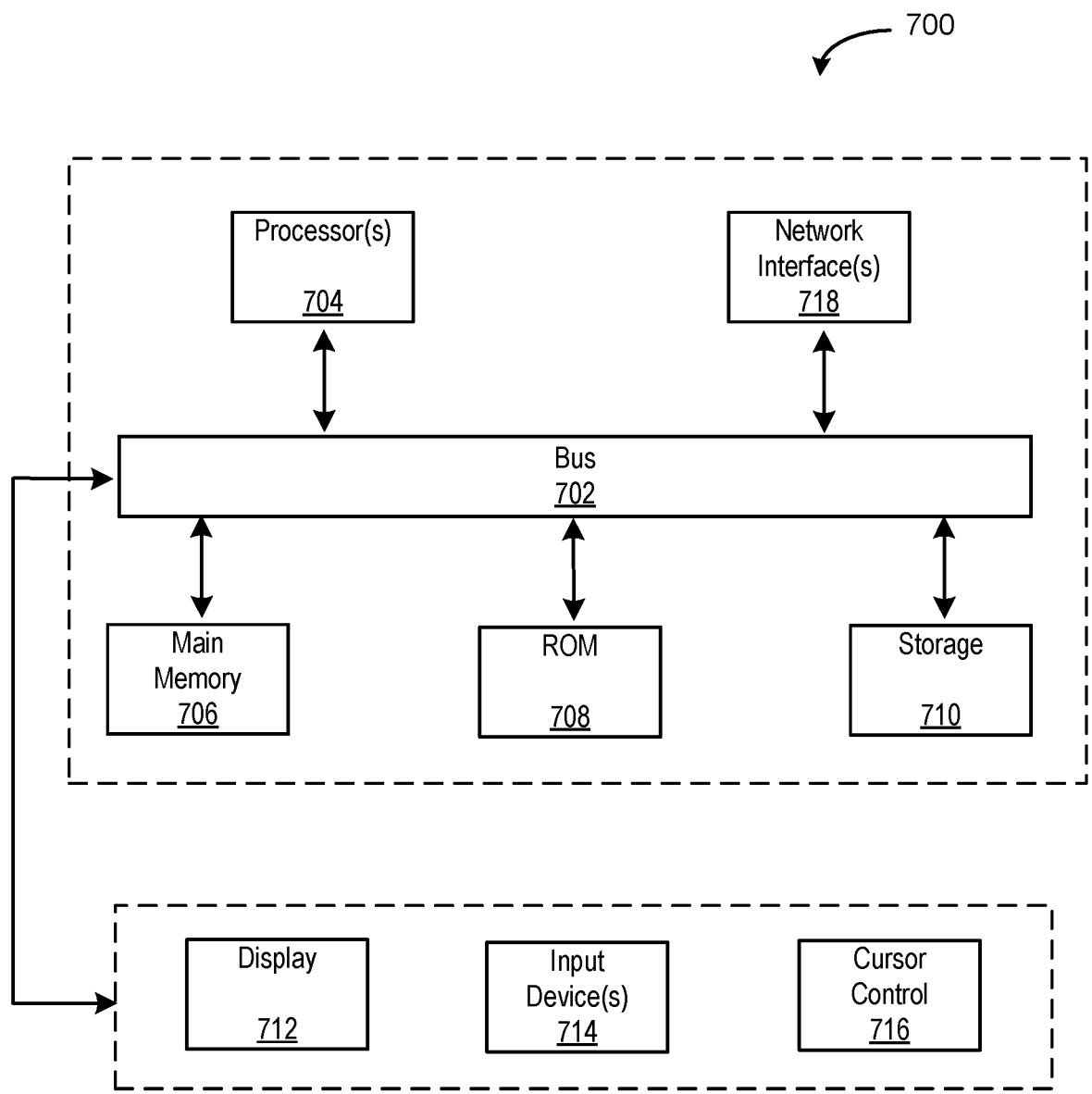
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

What is claimed is:

1. A computer-implemented method for point cloud segmentation comprising:
    feeding a plurality of features extracted from an input point cloud into a point cloud segmentation network, wherein the point cloud segmentation network comprises:
        an encoding path comprising a plurality of sequentially connected encoding nodes, wherein each encoding node decreases a feature resolution of an input of the encoding node;
        a decoding path following the encoding path and comprising a plurality of sequentially connected decoding nodes, wherein each decoding node increases a feature resolution of an input of the decoding node;
        a plurality of data links respectively corresponding to a plurality of levels of feature resolution, in which each of the plurality of data links connects one of the plurality of encoding nodes and one of the plurality of decoding nodes that have a same level of feature resolution, wherein:
            at least one of the plurality of data links connects a first encoding node and a first decoding node and comprises one or more intermediate nodes between the first encoding node and the first decoding node, and
            the at least one data link corresponds to a baseline feature resolution and exchanges data with (1) a first neighboring data link corresponding to a lower level of feature resolution than the baseline feature resolution and (2) a second neighboring data link corresponding to a higher level of feature resolution than the baseline feature resolution through the one or more intermediate nodes; and
    obtaining an output from a last decoding node from the decoding path of the point cloud segmentation network for object classification or part segmentation.

2. The computer-implemented method of claim 1, wherein when the at least one of the one or more intermediate nodes is a first intermediate node on the at least one data link, the first intermediate node is configured to:
    receive a first input from a first node on the at least one data link, wherein the first node is the first encoding node connected by the data link;
    receive a second input from a second node on the first neighboring data link corresponding to the lower level of feature resolution;
    receive a third input from a third node on the second neighboring data link corresponding to the higher level of feature resolution; and generate the output based on the first input, the second input, and the third input.

3. The computer-implemented method of claim 2, wherein the second node is an encoding node following the first encoding node on the encoding path.

4. The computer-implemented method of claim 2, wherein the third node is an intermediate node on the second neighboring data link corresponding to the higher level of feature resolution.

5. The computer-implemented method of claim 1, wherein at least one intermediate node on the at least one data link corresponding to the baseline feature resolution is further configured to:
feed data to an intermediate node on the first neighboring data link corresponding to the lower level of feature resolution than the baseline feature resolution.

6. The computer-implemented method of claim 1, wherein at least one intermediate node on the at least one data link corresponding to the baseline feature resolution is further configured to:
feed data to an intermediate node on the second neighboring data link corresponding to the higher level of feature resolution than the baseline feature resolution.

7. The computer-implemented method of claim 1, wherein each of the plurality of encoding nodes is configured to perform subsampling to decrease the feature resolution.

8. The computer-implemented method of claim 1, wherein each of the plurality of decoding nodes is configured to perform upsampling to increase the feature resolution.

9. The computer-implemented method of claim 1, wherein the first decoding node is configured to:
receive a fourth input from a preceding decoding node on the decoding path;
receive a fifth input from a last intermediate node on the at least one data link;
receive a sixth input from a last intermediate node on the second neighboring data link corresponding to the higher feature resolution than the at least one data link; and
perform a feature fusion based on the fourth input, the fifth input, and the sixth input and feed a fusion result into a second decoding node that is subsequent to the first decoding node on the decoding path.

10. The computer-implemented method of claim 1, wherein a first data link comprises more intermediate nodes than a second data link when the encoding node connected by the first data link has a higher feature resolution than the encoding node connected by the second data link.

11. The computer-implemented method of claim 2, wherein the first input has a base feature resolution, the second input has a lower feature resolution than the base feature resolution and richer semantic information, and the third input has a higher feature resolution than the base feature resolution and richer detail information.

12. The computer-implemented method of claim 2, wherein to generate the output based on the first input, the second input, and the third input, the first intermediate node is further configured to:
compute a semantic mask by applying a vector product operation on the first input and the second input;
compute a resolution mask by applying a vector addition operation on the first input and the third input;
transform the second input by applying the semantic mask;
transform the third input by applying the resolution mask;
transform the first input by applying a local aggregation on the first input; and
aggregate the first transformed input, the second transformed input, and the third transformed input to obtain the output.

13. The computer-implemented method of claim 12, wherein prior to computing the semantic mask and the resolution mask, the first intermediate node is further configured to:
compress the first input, the second input, and the third input into a single-channel format using a multi-layer perceptron (MLP).

14. The computer-implemented method of claim 12, wherein the semantic mask is computed by applying a sigmoid activation on an output of the vector product operation.

15. The computer-implemented method of claim 12, wherein the resolution mask is computed by applying a sigmoid activation on an output of the vector addition operation.

16. The computer-implemented method of claim 12, wherein to aggregate the first transformed input, the second transformed input, and the third transformed input, the first intermediate node is further configured to:
stack the first transformed input, the second transformed input, and the third transformed input to obtain multi-scale features; and
apply a multi-layer perceptron (MLP) to reduce channels of the multi-scale feature.

17. A cross-scale point cloud segmentation network architecture, comprising:
an encoding path comprising a plurality of sequentially connected encoding nodes, wherein each encoding node decreases a feature resolution of an input of the encoding node;
a decoding path following the encoding path and comprising a plurality of sequentially connected decoding nodes, wherein each decoding node increases a feature resolution of an input of the decoding node;
a plurality of data links respectively corresponding to a plurality of levels of feature resolution, in which each of the plurality of data links connects one of the plurality of encoding nodes and one of the plurality of decoding nodes that have a same level of feature resolution, wherein:
at least one of the plurality of data links connects a first encoding node and a first decoding node and comprises one or more intermediate nodes between the first encoding node and the first decoding node, and
at least one of the one or more intermediate nodes aggregates inputs from (1) a preceding intermediate node on the at least one data link corresponding to a baseline feature resolution, (2) an intermediate node on a first neighboring data link corresponding to a lower level of feature resolution than the baseline feature resolution, and (3) an intermediate node on a second neighboring data link corresponding to a higher level of feature resolution than the baseline feature resolution, generates an output based on the aggregated inputs and feeds the output into a next intermediate node towards a direction to the first decoding node.

18. The cross-scale point cloud segmentation network of claim 17, wherein the at least one intermediate node on the at least one data link corresponding to the baseline feature resolution is further configured to:

feed the output to an intermediate node on the first neighboring data link corresponding to the lower level of feature resolution than the baseline feature resolution; and feed the output to an intermediate node on the second neighboring data link corresponding to the higher level of feature resolution than the baseline feature resolution.

19. The cross-scale point cloud segmentation network of claim 17, wherein when the at least one of the one or more intermediate nodes is a first intermediate node on the at least one data link, the first intermediate node is configured to:

receive a first input from the first encoding node;

receive a second input from a second encoding node on the first neighboring data link corresponding to the lower level of feature resolution;

receive a third input from a third encoding node on the second neighboring data link corresponding to the higher level of feature resolution; and generate the output based on the first input, the second input, and the third input.

20. A non-transitory computer-readable storage medium for point cloud segmentation, configured with instructions executable by one or more processors to cause the one or more processors to perform operations comprising:

feeding a plurality of features extracted from an input point cloud into a point cloud segmentation network, wherein the point cloud segmentation network comprises:

an encoding path comprising a plurality of sequentially connected encoding nodes, wherein each encoding node decreases a feature resolution of an input of the encoding node;

a decoding path following the encoding path and comprising a plurality of sequentially connected decoding nodes, wherein each decoding node increases a feature resolution of an input of the decoding node;

a plurality of data links respectively corresponding to a plurality of levels of feature resolution, in which each of the plurality of data links connects one of the plurality of encoding nodes and one of the plurality of decoding nodes that have a same level of feature resolution, wherein:

at least one of the plurality of data links connects a first encoding node and a first decoding node and comprises one or more intermediate nodes between the first encoding node and the first decoding node, and the at least one data link corresponds to a baseline feature resolution and exchanges data with (1) a first neighboring data link corresponding to a lower level of feature resolution than the baseline feature resolution and (2) a second neighboring data link corresponding to a higher level of feature resolution than the baseline feature resolution through the one or more intermediate nodes; and obtaining an output from a last decoding node from the decoding path of the point cloud segmentation network for object classification or part segmentation.

* * * * *